US012663760B2

(12) United States Patent
Gachet et al.

(10) Patent No.: US 12,663,760 B2
(45) Date of Patent: *Jun. 23, 2026

(54) METHOD FOR TESTING AND MANUFACTURING SPIRAL SPRINGS FOR A TIMEPIECE

(71) Applicant: RICHEMONT INTERNATIONAL SA, Villars-sur-Glâne (CH)

(72) Inventors: David Gachet, Neuchâtel (CH); Kevin Soobbarayen, Pontarlier (FR); Susana Tobenas, Boudry (CH)

(73) Assignee: RICHEMONT INTERNATIONAL SA, Villars-sur-Glâne (CH)

( * ) Notice: Subject to any disclaimer, the term of this patent is extended or adjusted under 35 U.S.C. 154(b) by 358 days.

This patent is subject to a terminal disclaimer.

(21) Appl. No.: 18/261,472

(22) PCT Filed: Jan. 14, 2022

(86) PCT No.: PCT/EP2022/050760

§ 371 (c)(1),
(2) Date: Jul. 13, 2023

(87) PCT Pub. No.: WO2022/152857

PCT Pub. Date: Jul. 21, 2022

(65) Prior Publication Data

US 2024/0069496 A1 Feb. 29, 2024

(30) Foreign Application Priority Data

Jan. 18, 2021 (EP) .................................... 21152144

(51) Int. Cl.
*G04D 7/10* (2006.01)
*G04D 7/12* (2006.01)

(52) U.S. Cl.
CPC ............... *G04D 7/10* (2013.01); *G04D 7/125* (2013.01); *G04D 7/1285* (2013.01)

(58) Field of Classification Search
CPC ........ G04D 7/125; G04D 7/1285; G04D 7/00; G04D 7/004; G04D 7/02; G04D 7/12;
(Continued)

(56) References Cited

U.S. PATENT DOCUMENTS 6,534,742 B2 * 3/2003 Serex ........................ G04D 7/10
219/121.69
10,734,293 B2 * 8/2020 David ................. G03F 7/70633
(Continued)

FOREIGN PATENT DOCUMENTS

CH 281496 A 3/1952
CH 713306 A2 * 6/2018 ............... G04D 7/12
(Continued)

OTHER PUBLICATIONS

Watchmaking assembly (Year: 2018).*
(Continued)

*Primary Examiner* — Peter J Macchiarolo
(74) *Attorney, Agent, or Firm* — Conley Rose, P.C.

(57) ABSTRACT

A method for inspecting a spiral or a spiral blank arranged to form a spiral, the spiral having to exhibit at least one predetermined resonant frequency, the inspecting method including the following steps:

a. applying to the spiral or to the spiral blank a time-varying vibrational excitation to cover a predetermined frequency range,
b. identifying at least one characteristic of a resonant frequency, such as a resonance peak, of the spiral or of the spiral blank during the vibrational excitation over the predetermined frequency range,
c. submitting to a predicting machine the resonant frequency characteristic identified in the step b. to determine a stiffness of the spiral or of the spiral blank and/or determine whether or not a dimensional correc- (Continued)

tion of the spiral or of the spiral blank is necessary to obtain the predetermined resonant frequency.

18 Claims, 8 Drawing Sheets

(58) Field of Classification Search
CPC ....... G01H 13/00; G01M 13/00; G04B 18/00; G04B 17/066; G03F 7/705; G03F 7/70466; G03F 7/70525
USPC ........................... 73/665, 579; 368/9; 33/659
See application file for complete search history.

(56) References Cited

U.S. PATENT DOCUMENTS

| | | | | |
|---|---|---|---|---|
| 11,537,085 | B2 * | 12/2022 | Born | G04C 3/06 |
| 2019/0271946 | A1 * | 9/2019 | Hunziker | G04B 17/066 |
| 2022/0350255 | A1 * | 11/2022 | Tobenas Borron | B81C 1/00682 |
| 2024/0261867 | A1 * | 8/2024 | Jacot | G04D 7/004 |
| 2025/0053138 | A1 * | 2/2025 | Gachet | G04B 17/066 |

FOREIGN PATENT DOCUMENTS

| | | | | |
|---|---|---|---|---|
| DE | 921320 | C | 12/1954 | |
| EP | 4030241 | A1 * | 7/2022 | G04D 7/1285 |
| FR | 1502464 | A | 11/1967 | |
| JP | 2015179067 | A | 10/2015 | |
| JP | 2017111131 | A | 6/2017 | |
| WO | 2022152857 | A1 | 7/2022 | |

OTHER PUBLICATIONS

Hairspring manufacturing (Year: 2022).*
Foreign Communication from a Related Counterpart Application, International Search Report and Written Opinion dated Mar. 29, 2022, International Application No. PCT/EP2022/050760 filed on Jan. 14, 2022.
Foreign Communication from a Related Counterpart Application, Japanese Notice of Reasons for Refusal dated Dec. 22, 2025, Japanese Patent Application No. 2023-542990 filed on Dec. 12, 2022.

* cited by examiner

METHOD FOR TESTING AND MANUFACTURING SPIRAL SPRINGS FOR A TIMEPIECE

CROSS-REFERENCE TO RELATED APPLICATIONS

The present application is a filing under 35 U.S.C. 371 as the National Stage of International Application No. PCT/EP2022/050760, filed Jan. 14, 2022, entitled "METHOD FOR TESTING AND MANUFACTURING SPIRAL SPRINGS FOR A TIMEPIECE," which claims priority to European Patent Application No. 21152144.8 filed with the Intellectual European Patent Office on Jan. 18, 2021, both of which are incorporated herein by reference in their entirety for all purposes.

TECHNICAL FIELD

This invention relates to the field of the inspection and fabrication of parts for timepieces. The invention more specifically relates to a method for inspecting and fabricating spiral springs for timepieces, also known as resonators.

PRIOR ART

Mechanical watch movements are regulated by means of a mechanical regulator comprising a resonator, i.e. an elastically deformable component, the oscillations of which determine the operation of the watch. Many watches for example include a regulator comprising a spiral as the resonator, mounted on the shaft of a balance and set in oscillation using an escapement. The natural frequency of the balance-spiral pair is used to regulate the watch and depends in particular on the stiffness of the spiral.

Specifically, the frequency f of the regulating member formed by the spiral of stiffness R coupled with a balance of inertia I is predetermined by the formula:

$$f = \frac{1}{2\pi}\sqrt{\frac{R}{I}} \quad \text{[equation 1]}$$

The stiffness of the spiral also defines its intrinsic vibrational characteristics, such as the natural frequency and the resonant frequencies. In this application, the natural frequency of an elastic system (a single resonator or a resonator-balance pair) is the frequency at which this system oscillates when it is in free motion, i.e. with no exciting force. Moreover, a resonant frequency of an elastic system subjected to an exciting force is a frequency at which a local maximum of displacement amplitude can be measured for a given point of the elastic system. In other words, if the elastic system is excited with an excitation source with a time-varying frequency, the displacement amplitude follows an upward gradient before this resonant frequency, and follows a downward gradient afterwards, at any point that does not correspond to a vibration node. Typically, during such a test, the recording of the displacement amplitude as a function of the excitation frequency has a displacement amplitude peak or a resonance peak which is associated with or which characterizes the resonant frequency.

The stiffness of a resonator of spiral type typically depends on the characteristics of the material, as well as its dimensions and in particular the thickness (i.e. the width) of its windings along its bar. The stiffness is more specifically predetermined by:

$$R = \frac{M}{\varphi} \quad \text{[equation 2]}$$

with:
- φ, the torsion angle of the spring, and
- M, the return torque of the spiral spring,
- where M, for a bar of constant section composed of a specific material, is given by:

$$M = \frac{E\left(\frac{e^3 h}{12}\varphi\right)}{L} \quad \text{[equation 3]}$$

with:
- E, the Young modulus of the material used to make the bar,
- L, the length of the bar,
- h, the height of the bar, and
- e, the thickness or width of the bar.

The natural frequency of the regulating member formed by the spiral of stiffness R coupled with a balance of inertia I is in particular proportional to the square root of the stiffness of the spiral. The main specification of a spiral spring is its stiffness, which must be located within a clearly-defined interval to be able to be paired with a balance, which forms the inertial element of the oscillator. This pairing operation is essential to accurately adjust the frequency of a mechanical oscillator.

It is very important that the characteristics of the oscillator are as stable as possible, to also have a stable operation of the watch. Over the past few years the prevalence of magnetic fields in the modern environment has prompted watchmakers to use silicon spirals, which are less sensitive to magnetic disturbances than metal spirals.

Very advantageously, several hundred silicon spirals can be fabricated on a single wafer using micro-fabrication technology. Also known is the practice of making a plurality of silicon resonators with very high precision using methods of photolithography and machining/etching into a silicon wafer. The methods for producing these mechanical resonators generally use monocrystalline silicon wafers, but wafers made of other materials can also be used, for example made of polycrystalline or amorphous silicon, made of other semiconductor materials, glass, ceramic, carbon, carbon nanotubes or a composite comprising these materials. Monocrystalline silicon, meanwhile, belongs to the cubic crystal class m3m, the thermal expansion coefficient (alpha) of which is isotropic.

Silicon has a very negative first thermoelastic coefficient value, and consequently the stiffness of a silicon resonator, and therefore its natural frequency, varies greatly with temperature. To at least partially offset this drawback, the documents EP1422436, EP2215531 and WO2016128694 describe a mechanical resonator of spiral type made based on a core (or two cores in the case of WO2016128694) made of monocrystalline silicon and in which the temperature variations of the Young modulus are compensated for by a layer of amorphous silicon oxide ($SiO_2$) surrounding the core (or cores), the latter being one of the rare materials to have a positive thermoelastic coefficient.

When spirals are made of silicon or another material by collective fabrication on a wafer, the final functional yield will be predetermined by the number of spirals, the stiffness of which corresponds to the pairing interval, divided by the total number of spirals on the wafer.

However, the steps of micro-fabrication and more specifically etching, used in the fabrication of spirals on a wafer typically result in a considerable geometrical dispersion between the dimensions of the spirals of one and the same wafer, and therefore a considerable dispersion between their stiffnesses, notwithstanding the fact that the etching pattern is the same for each spiral. The measured stiffness dispersion normally follows a Gaussian distribution. To optimize the fabrication yield, it will be more beneficial to center the mean of the Gaussian distribution on a nominal stiffness value and also to reduce the standard deviation of this Gaussian.

In addition, the stiffness dispersion is even greater between spirals of two wafers etched at different times according to the same method specifications. This phenomenon is shown in FIG. 1 wherein the dispersion curves for the stiffnesses Rd1, Rd2 and Rd3 for the spirals on three different wafers are illustrated. In general, for each wafer the distribution of the stiffnesses R (in relation to the number of spirals N with this stiffness) follows the normal or Gaussian law, each dispersion curve being centered on its respective mean value Rm1, Rm2 and Rm3.

The documents WO2015113973 and EP3181938 propose to remedy this problem by forming a spiral of dimensions greater than the dimensions required to obtain a spiral of a predetermined stiffness, by measuring the stiffness of this spiral formed by coupling it with a balance endowed with a predetermined inertia, by computing the thickness of material to be removed to obtain the dimensions required to obtain the spiral with the predetermined stiffness, and by removing this thickness from the spiral. Similarly, the document EP3181939 proposes to remedy this same problem by forming a spiral of dimensions smaller than the dimensions required to obtain a spiral of a predetermined stiffness, by determining the stiffness of this spiral formed by coupling it with a balance endowed with a predetermined inertia, by computing the thickness of material to be added to obtain the dimensions required to obtain the spiral with the predetermined stiffness, and by adding this thickness of material to the spiral.

In this way, as demonstrated in FIG. 2, notwithstanding the mean stiffness Rm1, Rm2, etc. of the stiffnesses on a given wafer, the dispersion curve of the stiffnesses Rd1, Rd2, etc. can be recentered in relation to a nominal stiffness value Rnom.

This approach requires great accuracy as regards the measurement of the frequency of the spiral to determine its stiffness. In particular, measurement errors can be caused by the balance of predetermined inertia or by the set-up. Next a step must be performed of computing the thickness to be removed to once again remove, with great accuracy, the computed thickness. In addition, it can be noted that the coupling of the spiral with the balance endowed with a predetermined inertia necessitates painstaking operations requiring a long preparation time. Finally, it can also be noted that any operation of assembly on parts or blanks still present on a wafer significantly increases the risk of contamination (for example presence of fine particles of silicon (debris) produced during handling).

This invention has the aim of making provision for an approach exempt from the drawbacks above, which allows a production flow that is faster and/or with fewer risks of contamination, and/or a higher sampling rate, and/or more accurate measurement, and therefore more individualized correction of the spirals of the wafer.

DISCLOSURE OF THE INVENTION

More precisely, the invention relates to a method for inspecting a spiral or a spiral blank arranged to form a spiral, the spiral having to exhibit at least one predetermined resonant frequency, including the following steps:

a. applying to the spiral or to the spiral blank a time-varying vibrational excitation to cover a predetermined frequency range,
b. identifying at least one characteristic of a resonant frequency, such as a resonance peak, of the spiral or of the spiral blank during the vibrational excitation over the predetermined frequency range,
c. submitting to a predicting machine the resonant frequency characteristic identified in the step b. to determine a stiffness of the spiral or of the spiral blank and/or determine whether or not a dimensional correction of the spiral or of the spiral blank is necessary to obtain the predetermined resonant frequency.

The method according to the above implementation comprises a step of vibrational excitation of the spiral or of the spiral blank and measuring a characteristic of a resonant frequency, to then deduce therefrom, by prediction, a stiffness and/or whether or not a dimensional correction is necessary. There is no set-up with a balance or other component, which saves time. In addition, the measurement is taken on the spirals or the blanks alone, which limits errors incurred by other components or their set-up, along with possible contaminations. Accuracy of measurement is improved since there are fewer sources of variability due to other components or due to contaminations. In other words, the spiral or the spiral blank is tested alone. The vibrational excitation is applied to the part or to the individual blank, not coupled with any balance, weight or oscillating system. The method makes it possible to inspect the individual, free parts (i.e. with at least one free end, not fastened to any mechanism or balance), which provides at least advantages in terms of gains in productivity (no set-up with an oscillating system), gains in quality (no contamination of parts, or breakages, and more parts can be rested in the same budget), and a gain in accuracy (no error related to other components of an oscillating system).

According to an embodiment, the vibrational excitation is applied to the spiral or to the spiral blank having a free end (typically the central collet or ferrule) and another end attached to the wafer or to a clamp. From a mechanical point of view, it can be schematically considered that the vibrational excitation is applied to a mass (located at the center of gravity of the spiral) connected to a frame of reference (a gripping clip for a spiral on its own, or the remainder of a substrate or of a wafer for a blank for example made of silicon and not detached) by a spring (the elastic part of the spiral). The vibrational excitation sets the suspended mass in motion.

It can also be noted that if it is determined that a dimensional correction must be made to the tested part (or to all the individual parts attached to one and the same wafer, or else to the individual parts attached to an area of a wafer, including or not including the tested part), this can be done on the individual part(s) without dismantling anything again (provision can for example be made for applying an oxidization to a silicon part, directly on the part's exit from the test). Provision can therefore be made for adding or removing material to or from the individual part(s) to vary its intrinsic stiffness. In other words, the dimensional correction is carried out on the individual part(s), by changing its dimensions (typically the length and/or thickness of the bar forming the elastic part of the spiral).

The method according to the above implementation thus makes it possible to test spiral blanks during fabrication while limiting the risks of contamination or set-up errors. A dimensional correction (of section, height and/or thickness) is then possible. The method according to the above implementation can just as well be used to test finished spirals in order to, for example, make a classification by increments of stiffness, to make provision for pairing with a particular balance.

Of course, the frequency range of the obtained spectrum does not only depend on the vibrational excitation source but also on the sensor of the measuring instrument used. Thus, the frequency range is connected both to the excitation frequency range and to the frequency range to which the instrument for measuring the oscillation amplitude (vibrometer or otherwise) is sensitive. However the excitation frequency range will be chosen such as to include at least one resonant frequency of the spiral or of the blank tested.

The predetermined resonant frequency that the spiral must exhibit once finished can be a target natural frequency or a target resonant frequency, or a target natural frequency range, or a target resonant frequency range defined by a tolerance around a target value.

The dimensional correction predicted by the predicting machine can typically be a correction of the section of the flexible bar forming the spiral or the spiral blank, i.e. a correction either of the height, or of the thickness, or of both.

In the method above, the characteristic of a resonant frequency is a characteristic of the oscillatory response measured over a predetermined frequency range, comprising at least one resonant frequency. Such a characteristic is typically identified after processing a raw measurement signal (for example a measurement of the amplitudes or speeds or accelerations of displacement of certain points of the spiral or of the spiral blank), the processing being able to include, for example, a Fourier transform to identify resonance peaks and therefore resonant frequencies.

It can be noted that the method can determine a stiffness to effect a classification of the part, and/or to then compute/deduce a level of dimensional correction to be applied to obtain a target stiffness. Once can however take into account only the identified resonant frequency to directly compute/deduce a level of dimensional correction to be applied to obtain a target stiffness.

According to an embodiment, in the step a, the frequency range is applied simultaneously to a plurality of spirals or of spiral blanks. Rapidity is improved, since the vibrational excitation can typically be imposed on a wafer bearing several hundred spiral blanks, which would for example still be fastened to the wafer.

According to an embodiment, the frequency range is predetermined to encompass at least one frequency range:

- centered on the predetermined resonant frequency, and
- of an extent of at least 30% of the predetermined resonant frequency, i.e. ±15% of the predetermined resonant frequency. For example, if the predetermined resonant frequency is of 1 kHz, then the frequency range will go from 850 Hz to 1150 Hz.

According to an embodiment, the spiral has at least two predetermined resonant frequencies, and the frequency range is predetermined to cover at least the two predetermined resonant frequencies. By covering or scanning a wide frequency range, several resonance peaks (or resonant frequencies) can be measured, which can provide better accuracy.

According to an embodiment, the step a comprises the use of a source, such as a piezoelectric source, making it possible to induce or impose an acoustic excitation on an edge of a wafer bearing the spiral blank, or preferably on, or else under the spiral or the spiral blank to be specifically excited.

According to an embodiment, the acoustic source can be coupled with a chosen excitation cone to excite at least one spiral or spiral blank. Preferably, if a wafer supports several spiral blanks, then the acoustic source can be coupled with an excitation cone chosen to excite at least a part and preferably all of the spiral blanks.

According to an embodiment, the acoustic source can be chosen and/or adjusted to generate the time-varying vibrational excitation to cover the predetermined frequency range:

- with a sufficient amplitude to generate vibrations of the spiral or of the spiral blank of an amplitude sufficient to be detected by the means for measuring amplitude or speed or acceleration of displacement of at least one point of the spiral or of the spiral blank and/or
- for a duration sufficient to deduce therefrom vibrational spectra of the spiral or of the spiral blank.

According to an embodiment, the step b comprises the use of an optical measuring means, such as a Doppler laser vibrometer.

According to an embodiment, the step b is based on a measurement over time of an amplitude or of a speed, or else of an acceleration of displacement of at least one point of the spiral or of the spiral blank, preferably carried out at least partially during the step a.

According to an embodiment, the step b comprises:

- a step of identifying a resonant frequency of the spiral or of the spiral blank as a function of an operational or modal deformation of at least one point of the spiral or of the spiral blank. An operational or modal deformation is typically defined by an amplitude or speed of displacement or else of an acceleration and a direction of oscillation (outside or inside a particular plane) as a function of the excitation frequency.

According to an embodiment, the spiral or the spiral blank is contained in a base plane, and the step b comprises:

- a step b' of measuring an amplitude or a speed or an acceleration of displacement of at least one point of the spiral or of the spiral blank along a direction normal to the base plane, and/or
- a step b" of measuring an amplitude or a speed or an acceleration of displacement of at least one point of the spiral or of the spiral blank along a direction contained in the base plane.

The measurements of displacements or of speeds along several directions make it possible to better identify the peaks and resonant frequencies.

According to an embodiment:

- for a first predetermined resonant frequency, only the step b' of measuring a displacement or a speed of at least one point of the spiral or of the spiral blank along a direction normal to the base plane is carried out, and/or

- for a second predetermined resonant frequency, only the step b" of measuring a displacement or a speed of at least one point of the spiral or of the spiral blank along a direction contained in the base plane is carried out.

According to the resonant frequency, one may choose to measure in one direction or in another, to measure the greatest possible displacements or speeds, such as to minimize the measurement error. Specifically, as a function of the geometry of the spiral or of the spiral blank, the vibration mode (typically the direction of vibration) in response to the vibrational excitation can vary.

According to an embodiment, the step b comprises a step of processing the measurement signal with for example a Fourier transform, to identify resonance peaks of displacement amplitude or of speed or of acceleration, and/or of phase, as a function of the excitation frequency.

According to an embodiment, the step b comprises:

a step of identifying a resonance peak of the spiral or of the spiral blank as a function of an amplitude or of a speed of displacement of at least one point of the spiral or of the spiral blank.

According to an embodiment, the resonant frequency is identified on the basis of the width of the resonance or amplitude peak, at mid-height of the maximum value of the amplitude resonance peak. This processing method makes it possible to limit computation errors which could be made based only on the identification of the frequency-domain position of the peak defined by its maximum value.

According to an embodiment, the step c comprises a step of computing a stiffness of the spiral or of the spiral blank. The computing of the stiffness makes it possible to determine with improved accuracy whether or not a dimensional correction is necessary, and what value this correction must take. In addition, this also makes it possible to pre-dimension or choose a balance to couple the spiral once its fabrication is finished.

According to an embodiment, if a dimensional correction is necessary, then the method comprises a step of:

d. computing, with the predicting machine, the dimensional modification (modification of section, height and/or thickness) to be applied based on the resonant frequency characteristic identified in the step b.

According to an embodiment, the predicting machine implements a polynomial formula to predict whether or not a dimensional correction is necessary. It is for example possible to make a model by linear regression.

According to an embodiment, the predicting machine implements a classification carried out for example by a neural network to predict whether or not a dimensional correction is necessary.

According to an embodiment, the predicting machine implements a classification based on a partitioning into k-means or into k-medians to predict whether or not a dimensional correction is necessary.

According to an embodiment, the spiral blank being formed on a wafer comprising a plurality of spiral blanks distributed over several sectors of the wafer, the step b comprises a step consisting in identifying at least one characteristic of a resonant frequency of at least one spiral blank for each sector, and the step c comprises a step consisting in determining a stiffness of the spiral blank and/or in determining for the spiral blanks of each sector whether or not a dimensional correction is necessary. The accuracy of the dimensional correction (section, height and/or thickness) is improved by refining the analysis by sectors of the wafer.

According to an embodiment, the inspecting method comprises a step of computing, with the predicting machine, the dimensional modification to be applied for the spiral blanks of each sector.

According to an embodiment, the step a comprises a step consisting in modifying a direction of vibrational excitation over time, preferably in a direction pointing toward the spiral or the spiral blank, the resonant frequency characteristic of which is identified in the step b.

According to an embodiment, the inspecting method comprises a preliminary step consisting in taking into account the material of the spiral or of the spiral blank, and in adjusting a maximum amplitude of the vibrational excitation and/or a range of frequency of the predetermined frequency range as a function of the material of the spiral or of the spiral blank.

According to an embodiment, the obtained frequency range extends over a range of frequencies ranging from 0 Hz to 100 kHz, preferably from 0 Hz to 50 kHz, more preferably from 0 Hz to 40 kHz, and most preferably from 10 kHz to 35 kHz. The applicant noticed that the accuracy of the prediction was better for the peaks or resonant frequencies located over a high frequency range. Specifically, if one considers the thickness, its influence on the resonant frequency is greater in high frequency ranges (for example 10 kHz to 35 kHz), although the sensitivity and accuracy are better over this particular range.

According to an embodiment, the step a and the step b are repeated at least several times for one and the same measurement point of the spiral or of the spiral blank.

According to an embodiment, the step a and the step b are synchronized. Such a synchronization procures the possibility of detecting a phase difference, or an attenuation, or a coupling, the taking into consideration of which can improve the accuracy of the prediction, or make it possible to adjust or reset the vibrational excitation source.

A second aspect of the invention relates to a method for fabricating a spiral having at least one predetermined resonant frequency comprising the steps consisting in:

forming at least one spiral or one spiral blank having dimensions contained within predetermined tolerances necessary to obtain the predetermined resonant frequency, inspecting the spiral or the spiral blank according to the inspecting method of the first aspect.

According to an embodiment, the fabricating method comprises a step consisting in:

correcting at least one dimension of the spiral blank formed during the step a., according to the computation of the step d. of claim 11, to obtain a spiral having the predetermined resonant frequency.

The dimensions (the section, the height and/or the thickness) may be corrected by removing or by adding material.

According to an embodiment, the spiral or the spiral blank is formed out of silicon, or glass, or ceramic, or metal, or carbon nanotubes. In particular, it is possible to test conventional spirals made of metal (steel, nickel-phosphorous alloy etc.). In this case, the metal spiral is clamped or taken as a reference by a tool which positions it facing the emission source and the displacement measuring apparatus.

According to an embodiment, the spiral blank is formed on a wafer, with a plurality of other spiral blanks.

A third feature of the invention relates to a method for training a predicting machine to implement the step c of the inspecting method of the first aspect, comprising the steps consisting in:

i—forming spirals or spiral blanks, ii—applying to each of the spirals or to each of the spiral blanks a time-varying vibrational excitation to cover a predetermined frequency range, iii—identifying at least one characteristic of a resonant frequency of each spiral or of each spiral blank during the vibrational excitation over the predetermined frequency range, iv'—setting up a plurality of spirals or of spiral blanks in an oscillating mechanism having a predetermined inertia such as to measure for each spiral or each spiral blank a free oscillation frequency or a stiffness and/or iv"—modeling in a simulation tool a plurality of spirals or of spiral blanks in an oscillating mechanism having a predetermined inertia such as to measure for each spiral or each spiral blank a free oscillation frequency or a stiffness v—supplying to the predicting machine, and for each spiral or each blank:

the characteristic of the resonant frequency identified in the step iii—;

the free oscillation frequency or the stiffness measured in the step iv'— and/or computed in the step iv"—.

Preferably, the choice will be made to use a measuring instrument which is sensitive enough over the chosen frequency range, while also making sure that the vibrational behavior of the spiral can be made use of over this chosen frequency range.

According to an embodiment, the step iii— comprises a preliminary phase of identifying reference measuring points with:

the measurement of a displacement or of a speed of displacement of a plurality of predetermined points of the spiral or of the spiral blank, the identification of nodes from among the plurality of predetermined points, which have at least one frequency or resonance peak a displacement amplitude which is zero or less than a first threshold peak value, the selection of reference points to be measured during the inspection from among the plurality of predetermined points, which are different from the identified nodes, and which preferably each have a displacement amplitude peak greater than a second threshold peak value.

Such a step of identifying reference points makes it possible to eliminate the points or areas which are nodes (i.e. immovable points) at one or more resonant frequencies.

According to an embodiment, the spiral or the spiral blank has a radius Ra defined between a free central end and a fixed peripheral end, and at least two reference points, and preferably four reference points are chosen and located:

in a first area at least of 0.20×Ra, or in a second area between 0.05×Ra and 0.30×Ra, or in a third area between 0.35×Ra and 0.65×Ra, or in a fourth area between 0.65×Ra and 0.85×Ra.

The choice of these areas guarantees that points whose displacements are tracked have a sufficient displacement amplitude to be measured correctly and with good accuracy.

Alternatively, provision can be made for measuring the displacements/movements/vibrations only on a particular point preferably located in an area of the part that has large dimensions and/or which does not deform (or deforms only marginally by comparison with the deformations related to the oscillations of the spiral). In particular, provision can be made for pointing the measurement at a point of the ferrule of the spiral or of the spiral blank. This is because, firstly, the ferrule has large dimensions in relation to the windings (one winding typically has a width of 20 μm to 40 μm, the ferrule can have minimum dimensions of 110 μm) which makes the sighting of the measuring tool easier, and secondly, the ferrule can be considered undeformable during the vibrational excitation and all the points of the ferrule have similar displacements/movements/vibrations. Consequently, the sighting of the measuring point (of a size of 4 μm for a laser sensor for example) on the ferrule will be easier, and/or a small error of location of the measuring point on the ferrule will be of little consequence for the end result. Moreover, having chosen a particular measuring point on the part, it is possible to identify and choose a particular frequency range to conduct the stiffness prediction.

According to an embodiment wherein several parts still attached to a substrate or to a tool are to be tested in series, provision can be made for:

a step of capturing images of the parts to be tested, a step of analyzing the image to, for example, recognize each type of part, and/or the position and/or orientation of each part, a step of selecting one or more points to be measured for each part, and/or selecting an excitation vibration spectrum to be imposed on each part and/or each selected point, for each part to be tested, a step of positioning the substrate or the tooling bearing the parts to be tested in an vibrational excitation and measuring apparatus. According to this implementation, the excitation and measurement can be automated in the case of a wafer which still carries the spiral blanks:

one or more images of the wafer are taken, an automatic image analysis is carried out to know at least the position X-Y of each part (a recognition of the part type or model can also be carried out), as a function of the position and/or of the orientation and/or of the type of part recognized, particular preset measuring points are identified or selected (for example on the ferrule), and a particular excitation cycle can also be selected as a function of the type of part or of a particular point, with for example a tooling which carries the wafer and which comprises a table movable along X-Y, each spiral blank is successively placed automatically facing the excitation source and the measuring apparatus to be tested by sighting the correct measuring point and by applying the correct excitation specification. Optionally, an autofocus step can be carried out, i.e. an adjustment of the relative position along z of the position of the vibrometer head, making it possible to obtain the sharpest possible image of the observed part. The laser beam is thus focused exactly on the surface of the part, on condition that the focal planes of the laser beam and of the observation camera are colinear, or that their phase difference is known and systematically compensated for.

According to an embodiment, as a function of the selected measuring point on the part to be tested and/or as a function of the excitation frequency, and/or as a function of the model of part to be tested, provision can be made for a step consisting in giving a particular orientation to the excitation direction and/or measuring direction. For this purpose, an excitation direction (or an axial direction of the excitation source) may be chosen perpendicular to the part to be tested to maximize the displacements perpendicular to the plane formed by the part at rest. An excitation direction (or an axial direction of the excitation source) may be chosen inclined with respect to the part to be tested to maximize the displacements contained in the plane formed by the part at rest. As regards the measurement, a measurement direction (or an axial direction of a laser beam of the measuring apparatus) may be chosen perpendicular to the part to be tested to maximize the accuracy of measurement of the displacements perpendicular to the plane formed by the part at rest. A measurement direction (or an axial direction of a laser beam of the measuring apparatus) may be chosen inclined with respect to the part to be tested to maximize the accuracy of measurement of the displacements contained in the plane formed by the part at rest. In the case of a measurement along an inclined axis, provision can be made for a receiving sensor suitable for receiving the reflected signal, as a function of the roughness of the parts: for “mirror” parts with low roughness, provision can be made for a reception sensor with a large collection cone (which preferably covers at least twice the angle of inclination), or offset, while for “rough” parts provision can be made for the reception sensor to be colinear with the light emission source.

According to an embodiment wherein several parts are attached to a substrate such as a wafer, provision can be made for taking a sample by detaching one part or a small number of parts to test them individually, and deduce therefrom a particular excitation frequency to be applied, and/or a particular measurement point to be used, and/or a particular region of the vibrational spectrum to be taken into account to take therefrom the desired resonant frequency characteristic. In other words, this preliminary sampling makes it possible to test, under good conditions, isolated parts (measurement errors and interference are limited) to choose the best test conditions for the parts that have remained secured to the substrate. In the scenario of excitation of parts attached to a substrate, provision can be made for exciting and measuring the response of the substrate, in order to identify and subsequently exclude the spectral ranges over which the latter vibrates.

BRIEF DESCRIPTION OF THE DRAWINGS

Other details of the invention will appear more clearly on reading the following description, given with reference to the appended drawings wherein.

EMBODIMENT OF THE INVENTION

FIGS. 3A-3F are a simplified representation of a method for fabricating a mechanical resonator 100 on a wafer 10. The resonator is in particular intended to equip a regulating member of a part for a timepiece and, according to this example, is in the form of a silicon spiral spring 100 which is intended to equip a balance of a mechanical movement for a timepiece.

Figure 3A:
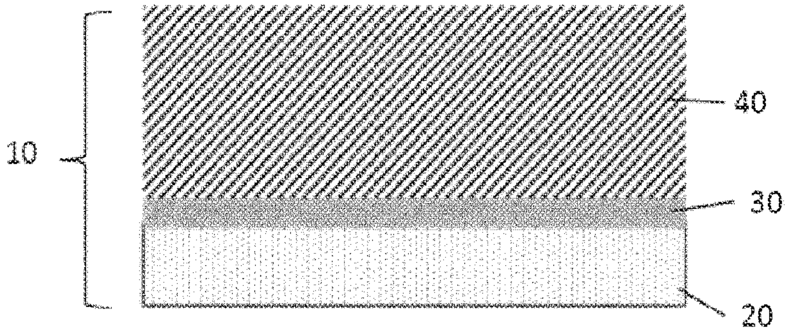
FIGS. 3A-3F are a simplified representation of a method for fabricating a mechanical resonator, here a spiral, on a wafer.

The wafer 10 is illustrated in FIG. 3A as a wafer SOI (silicon on insulator) wafer and comprises a substrate or “handler” 20 carrying from a sacrificial silicon oxide ($SiO_2$) layer 30 and a monocrystalline silicone layer 40. By way of example, the substrate 20 can have a thickness of 500 μm, the sacrificial layer 30 can have a thickness of 2 μm and the silicon layer 40 can have a thickness of 120 μm. The monocrystalline silicon layer 40 can have any crystalline orientation.

Figure 3B:
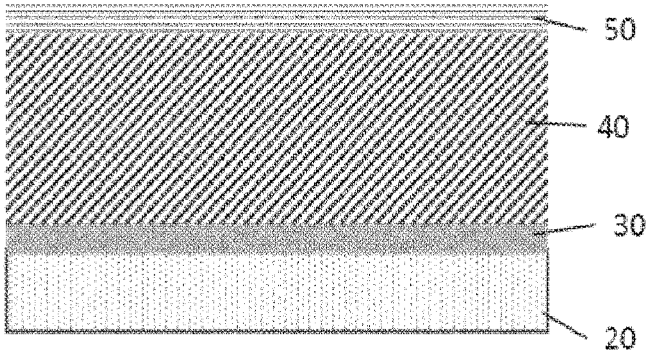
Figure 3C:
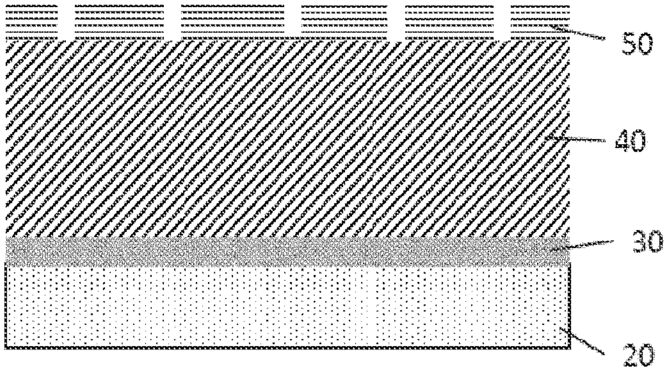

A step of lithography is shown in FIGS. 3B and 3C. The term “lithography” should be understood to mean all the operations making it possible to transfer an image or pattern onto or above the wafer 10 toward the latter. With reference to FIG. 3B, in this exemplary embodiment, the layer 40 is covered with a protective layer 50, for example made of curable resin. This layer 50 is structured, typically by a step of photolithography using an ultraviolet light source as well as, for example, a photomask (or another type of exposure mask) or a stepper and reticle system. This structuring by lithography forms the patterns for the plurality of resonators in the layer 50, as illustrated in FIG. 3C.

Figure 3D:
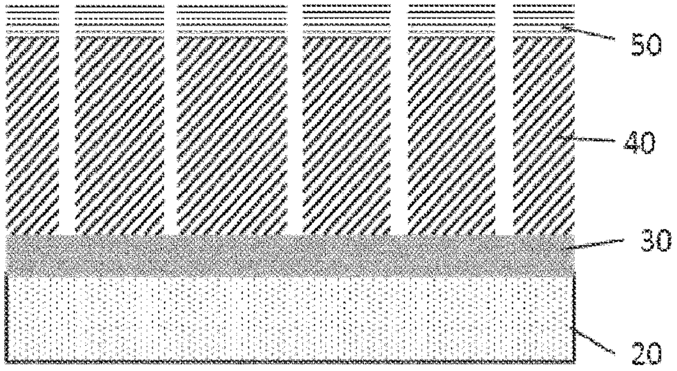

Subsequently, in the step of FIG. 3D, the patterns are machined, particularly etched, to form the plurality of resonators 100 in the layer 40. The etching can be carried out by a DRIE (Deep Reactive Ion Etching) technique. After the etching, the remaining part of the protective layer 50 is subsequently eliminated.

Figure 3E:
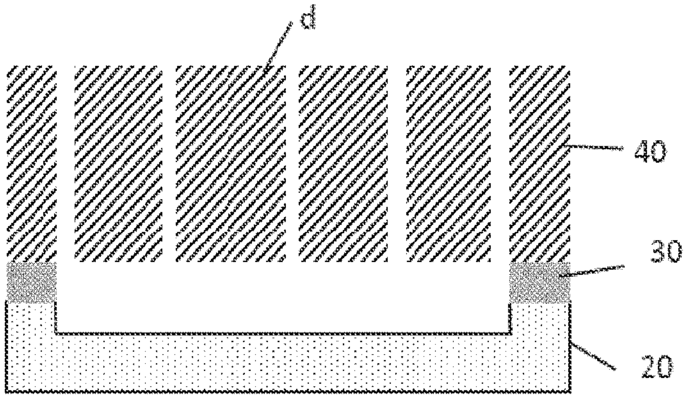

In FIG. 3E, the resonators are released from the substrate 20 by locally removing the sacrificial layer 30 or by etching all or part of the silicon of the substrate or handler 20. A smoothing (not illustrated) of the etched surfaces can also take place before the release step, for example by a step of thermal oxidization followed by a step of deoxidization, constituted for example of hydrofluoric acid (HF) wet etching.

Figure 3F:
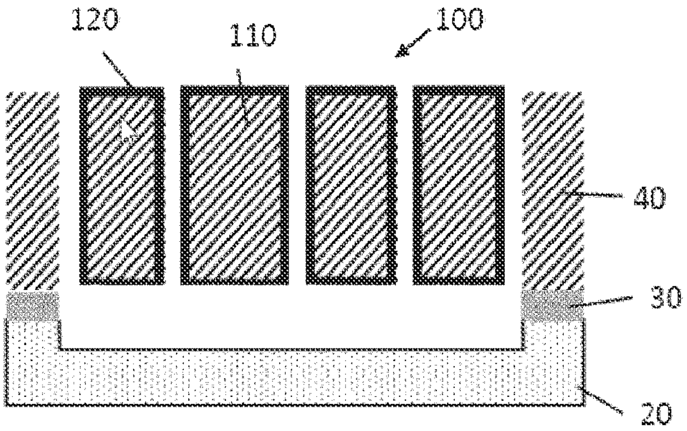
Figure 4:
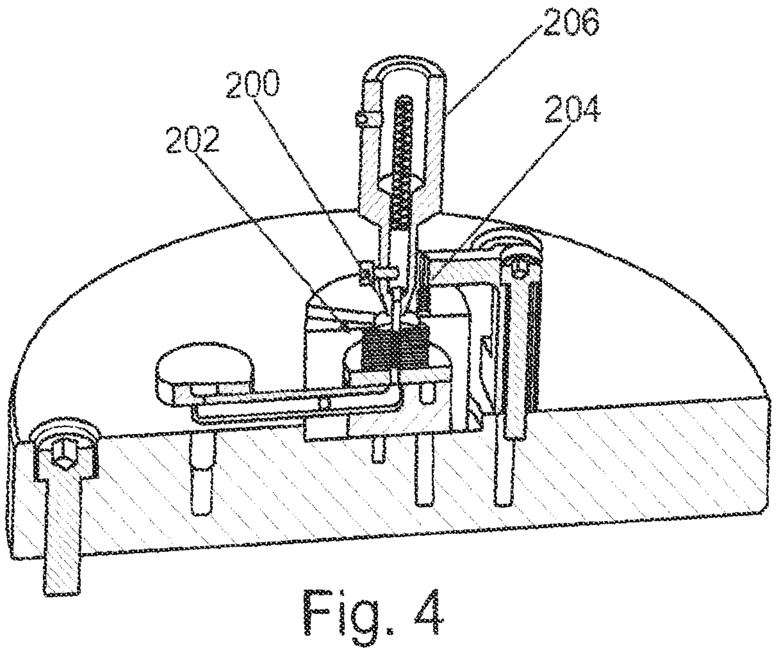
FIG. 4 shows a device for evaluating the torque of a spiral, FIG. 5 schematically represents the implementation of the evaluation of the stiffness of a spiral by vibrational analysis.

In the last step of the fabricating method in FIG. 3F, the windings 110 of the silicon resonator 100 are covered with a silicon oxide (SiO2) layer 120, typically by a step of thermal oxidization to produce a thermocompensated resonator. The formation of this layer 120, which generally has a thickness of 2-5 μm, generally affects the final stiffness of the resonator and must therefore be taken into account during the preceding steps to obtain vibrational characteristics of the spiral leading to the obtainment of a particular natural frequency of the spiral-balance pair in a given watch mechanism. As indicated above, in the stage preceding the production of the thermocompensating layer, the different resonators formed in the wafer generally present a considerable geometric dispersion between them and therefore a considerable dispersion between therefore a considerable dispersion between their stiffnesses, even though the steps of forming the patterns and machining/etching through these patterns are the same for all the resonators.

Moreover, this stiffness dispersion is even greater between the spirals of two wafers etched at different times even if the same method specifications are used.

The description above relates to silicon resonators 100, but it can be envisioned to make the resonators out of glass, ceramic, carbon nanotubes, or metal.

Figure 1:
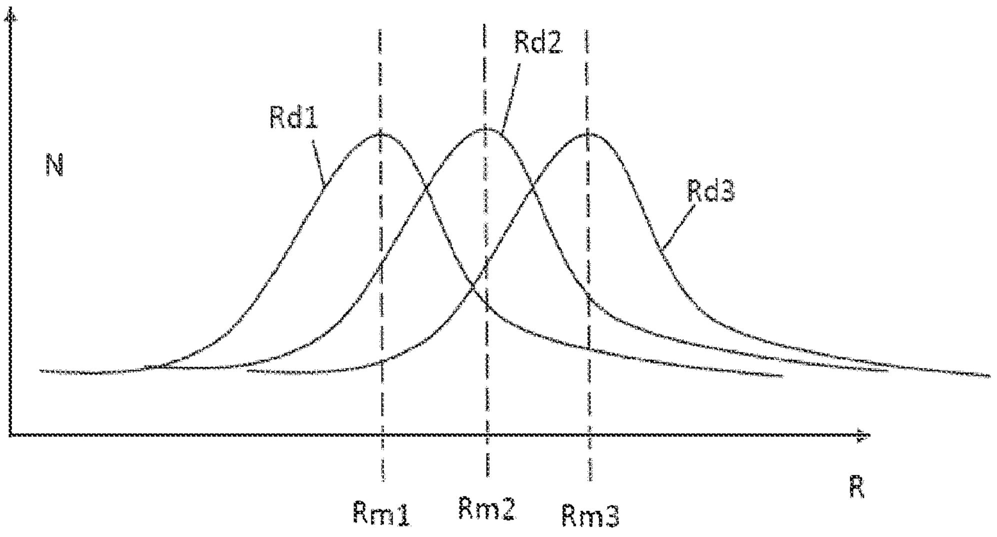
FIG. 1 shows the uncorrected stiffness dispersion curves for the spirals on three different wafers.
Figure 2:
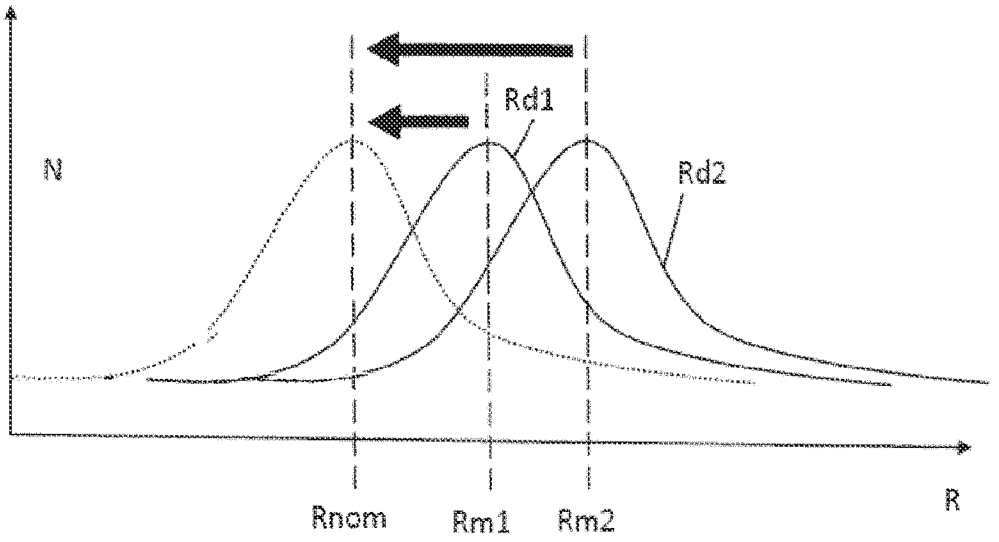
FIG. 2 shows the centering of the mean stiffness over one wafer around a nominal value.

To center the mean of the stiffnesses of the resonators on different wafers in relation to a nominal stiffness value as illustrated in FIG. 2, the resonators obtained in the step 3E on the wafer 10 in question can be deliberately formed with dimensions d that are different to the required dimensions (for example greater) for the obtainment of a nominal or target stiffness. Thus, it is possible to put in place an inspection method intended to estimate the vibrational characteristics of the resonators (natural frequency and/or resonant frequencies) to deduce therefrom the stiffness and/or the actual dimensions of the resonators 100 to correct the dimensions thereof, which will lead to the obtainment of the natural frequency of the desired resonator-balance pair.

This invention makes provision for determining on the basis of at least one characteristic of a resonant frequency of a sample of resonators 100 on the wafer in the step 3E whether or not a geometrical correction of the resonators is necessary. If so, this invention makes provision for accurately computing the thickness of material to be modified (to be removed or added), around each spiral, to obtain the dimensions leading to the obtainment of the vibrational characteristics of the resonators (natural frequency and/or resonant frequencies, and/or stiffness) corresponding to target values, according to a more effective method than the methods of the prior art.

Thus, the invention makes provision for determining at least one characteristic of a resonant frequency of a sample of resonators by vibrational measurement and applying a predictive method (for example a computer model or a classification or categorization method) to relate the result of said vibrational measurement to the necessary geometrical correction.

One thus makes use of the modal properties of the spiral attached to the wafer. During a training phase, and by an analytic and numerical approach, it is possible to introduce a predicting machine by establishing a predictive model relating the dimensions (particularly thickness) and/or stiffness at certain frequencies (natural frequency or resonant frequencies associated with a resonance peak or with a mid-height width) specifically chosen.

Once the training phase is finished (once the modes to be made use of as well as the excitation frequencies have been determined), it is possible to pass on to a predicting phase and to use the predicting machine by making use of the predictive model to inspect the resonators of a produced wafer, in order to predict whether or not a correction of the dimensions is necessary, and where applicable, compute or predict the exact correction to be made to the dimensions of the resonators (by removal if the blank is made with dimensions greater than the final dimensions required, or by addition of material if the blank is made with dimensions less than the final dimensions required, for example).

Thus, it is possible to incorporate the inspecting method into a fabricating method to correct, if necessary, the vibrational characteristics of the resonators (natural frequency and/or resonant frequencies, and/or stiffness) to obtain a particular and predetermined oscillation natural frequency, once the resonators are each paired with a balance of a given watch mechanism.

Vibrational Excitation

The measurement of the vibrational excitation of the resonators makes it possible to deduce at least one characteristic of a resonant frequency, such as for example a value of a resonant frequency. To describe in detail: a vibrational excitation must first be imposed on the wafer. Several options are available:

a. Measurements in the frequency domain:

1—Using a piezo-electric source (or any other source making it possible to induce or impose an acoustic excitation) on the edge of the wafer, on, or under the spiral blank 200 to be specifically excited (preferred blank) which excites at a particular frequency $f_0$ (continuous single-frequency excitation). In this variant, the excitation is sustained.

2—In a variant, the piezo-electric source (or any other source making it possible to induce or impose an acoustic excitation) can also be used on the edge of the wafer, on, or under the spiral blank 200 to be specifically excited (preferred spiral blank) which excites at a time-varying frequency to cover a predetermined frequency range, ranging for example from 0 to 100 kHz, preferably from 0 to 75 kHz, preferably from 0 to 50 kHz, preferably from 5 kHz to 50 kHz, and preferably from 10 to 35 kHz. The entirety of the frequency range can be scanned or covered in a time interval which can range from a fraction of a second to a few seconds. For example, provision can be made for scanning or covering the range of frequencies of the frequency range in less than 0.5 s, less than 1 s, or less than 1.5 s. In this variant, the excitation frequency changes continuously.

b. Time-domain measurements: use an excitation hammer (or any other source making it possible to induce a pulsed acoustic excitation) on the edge of the wafer, on, or under the spiral to be specifically excited (preferred spiral) which gives an acoustic pulse which is as short as possible (pulsed multi-frequency excitation). In this variant, the excitation is a point excitation and not sustained.

Moreover, the measurements can be taken following a particular sampling, for example in a sampling range of 4, 2 to 1 Hz. Specifically, the resolution for processing the acquisition data, for example according to a Fourier transform, depends directly on the duration of this acquisition.

Moreover, a signal sampling frequency of at least 100 kHz may be chosen if the frequency range extends to 50 kHz for example.

In general, provision can finally be made for changing the direction of excitation, i.e. the direction of the movements imposed by the source (vibrations can be imposed along one or more axial directions, and this direction or directions can be varied over time). In the case where a wafer comprising a plurality of resonators is excited, provision can be made for setting the direction of the vibrations such as to point to one or the other of the resonators, as a function of the displacement amplitude measurements described below.

Finally, provision can be made for coupling the acoustic source with a divergent cone directed toward the resonators to be excited, and for setting the acoustic source to emit an excitation signal with sufficient amplitude to be detected and measured in an accurate manner by the chosen measurement instruments.

Measurement of Amplitude or Speed, or Acceleration of Displacement

During the excitation, a recording is made, via a suitable measuring means, of the amplitude and the phase (with respect to the excitation source) of oscillation in the 3 directions X, Y (in the plane) and Z (out of the plane) of the specifically excited spiral. Without limitation, the following possible measuring means can be cited:

Optical methods by interferometry:

a. By 3D Doppler effect (laser Doppler vibrometer), b. Holographic,

Stroboscopic optical methods,

High time-domain resolution chromatic confocal profilometry,

Optical reflectometry:

a. Vibrational analysis by beam deflection on multi-dial detector or camera, b. Analysis by time-domain analysis of TCSPC type, Acoustic methods by Doppler ultrasound.

Figure 5:
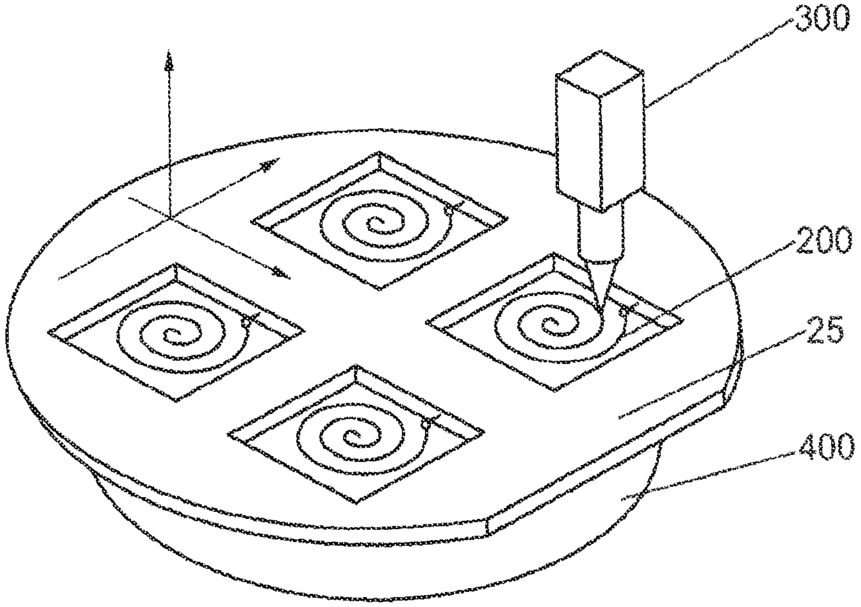

FIG. 5 schematically represents a silicon wafer 25 on which are formed a plurality of spiral blanks 200. A vibrational excitation source 400 is coupled with the wafer 25, so as to be able to impose a vibrational excitation. Consequently, each spiral blank 200 will be set to vibrate, and a laser vibrometer 300, here focused on a point of the right spiral blank 200 will be able to measure the amplitudes of vibration of the measurement point over time. Provision can be made for measuring the displacements along a direction normal to the plane of the wafer 25, but it is equally possible to measure the displacements along one or more directions contained in the plane of the wafer 25.

Once a particular point has been studied, the laser vibrometer 300 can be displaced to another measuring point of the spiral blank 200, or one can pass on to another spiral blank 200 of the wafer 25. Of course, the spiral blank 200 can alternatively be displaced in relation to the laser vibrometer.

Figure 6:
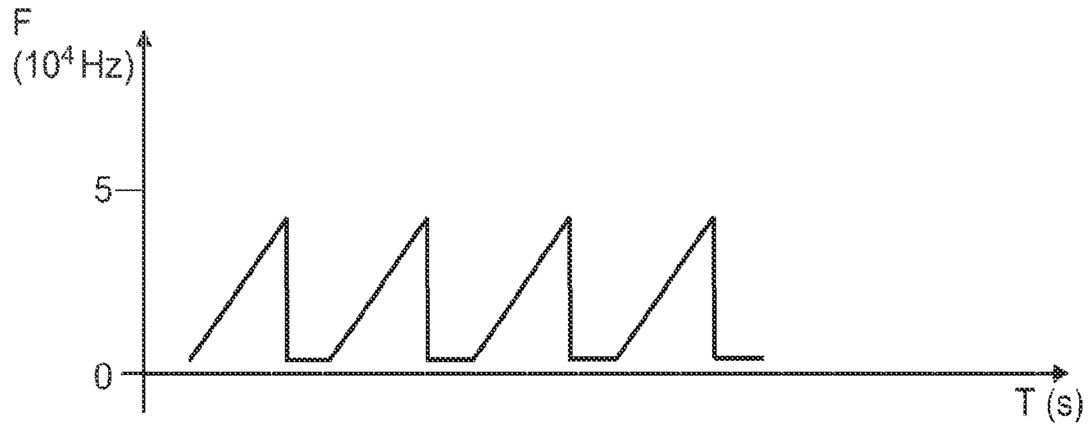
FIG. 6 shows an example of frequencies applied to a silicon wafer bearing spiral blanks, to impose a vibrational excitation.

FIG. 6 shows an example of vibrational excitation over time. In the given example, the excitation frequency varies over time, between 0 Hz and 50 kHz, and a succession of rising edges can be imposed, each spaced apart by an idle period without excitation. For each measurement point of the spiral blank 200, a plurality of rising edges can be imposed (between 2 rising edges and 60 rising edges), each lasting between 0.5 s and 2 s for example.

Selection of Reference Points to be Measured

As regards the displacement amplitude measurement, during the training phase, provision can be made for a step consisting in identifying points of the resonator for which the vibrational response is significant. Specifically, in the case of a spiral on which a vibration is imposed, especially if the frequency is time-varying, the vibration response will cause the appearance on the spiral of nodes, i.e. particular points of the spiral, the displacement amplitude of which is low or zero. If a measurement of the displacement is taken on a point of the spiral which proves to be a node with one of more particular frequencies, the identification of resonant frequency characteristics will be negatively affected.

Thus, it is advantageous to make provision for a preliminary step of measuring displacements at a plurality of predetermined points of the spiral, for example at least ten predetermined points, preferably at least twenty or so predetermined points, and most preferably at least thirty predetermined points. Provision can be made for selecting the predetermined points arranged on an orthonormal frame of reference X-Y in the plane of the spiral.

At the end of this preliminary step of measuring amplitudes at the predetermined points, provision can be made for identifying resonant frequencies for each measurement point, and next a step of selecting reference points for which the measurement of displacement amplitude during excitation shows that they are not nodes at these resonant frequencies. In other words, the identified nodes exhibit, at least one resonant frequency, a displacement amplitude which is zero or less than a first threshold peak value, and these points forming nodes are excluded from the reference points to be considered for subsequent measurements. It can also be noted that the reference points differ as a function of the position of the spiral blank 200 on the wafer 25.

Typically, it can be considered that at least two reference points will be selected, and preferably at least four reference points will be selected. In the case where the resonator has a radius Ra and is secured or fixed on the wafer by its outer pinning end, four reference points can preferably be chosen and located:

in a first area at less than 0.20×Ra (for example on the central ferrule), or in a second area between 0.05×Ra and 0.30×Ra (for example on the second winding starting from the ferrule), or in a third area between 0.35×Ra and 0.65×Ra (for example on a winding located in the middle of the spiral), or in a fourth area between 0.65×Ra and 0.85×Ra (for example on a winding located at three-quarters of the length of the spiral).

Thus, the reference points are distant from the part secured to the wafer and naturally have a considerable oscillatory displacement capability, which ensures better accuracy of the displacement measurement.

Moreover, one can also measure the displacements of one point of the body of the wafer, and/or one point of the excitation source, to identify or measure, for example, a phase difference or a vibrational attenuation, or else a resonance from a vibrational coupling or else from the wafer. These additional measurements make it possible to ensure that the identified peaks are indeed those of the spiral alone. One can also synchronize the displacement amplitude measurement and the vibrational excitation.

Determination of the Vibrational Characteristics

Several scenarios then arise according to the field previously chosen for the excitation:

a. Measurements in the frequency domain

1—variant with sustained excitation:

i. Integrating over time the amplitude and phase of oscillation over a long enough time to have a good spectral resolution at the excitation frequency $f_0$, ii. Offsetting the oscillation frequency by delta f to excite at the frequency $f_0$+□f and repeat the integrating step i, iii. Reconstructing amplitude and oscillation phase spectra as a function of the excitation frequency (possibly with several peaks at several frequencies).

2—variant with excitation of time-varying frequency:

i. Recording in the time domain the amplitude and the oscillation phase during the frequency scanning of the frequency range, ii. Repeating the step i—at least once, preferably at least three times, iii. Reconstructing the amplitude and oscillation phase spectra as a function of the excitation frequency (possibly with several frequency peaks).

b. Measurements in the time domain:

i. Recording the displacement over time of the winding along X, Y and Z over a long enough time, in such a way as to obtain a sufficiently representative signal, such as for example a few seconds.

ii. One may choose to record the signal to make it into a reference signal to be compared with other signals measured at other parts. One may also choose to subject the signal to processing of Fourier transform type to identify resonant frequencies in the recorded signal.

Consequently, at least one resonance peak can be identified for each excited resonator, and provision is made for determining the resonant frequency not on the basis of the resonance peak apex, i.e. on the maximum amplitude, but rather over an area of the curve located between 25% and 75% of the maximum amplitude value of the resonance peak, for example based on its mid-height width. This is because this processing method, which focuses on a part of the curve between 25% and 75% of the maximum amplitude value of the resonance peak, makes it possible to limit errors due to the singularity of the maximum amplitude point and due to the approximation calculations to reconstruct the apical part of the resonance peak. The area of the curve located between 25% and 75% of the maximum amplitude value of the resonance peak has a better accuracy than the part above 75% (typically the peak), which offers better accuracy on the exact determined resonant frequency. One may for example take the middle of the segment connecting the two points at mid-height of the resonance peak to determine the resonant frequency associated with the peak in question.

Figure 7:
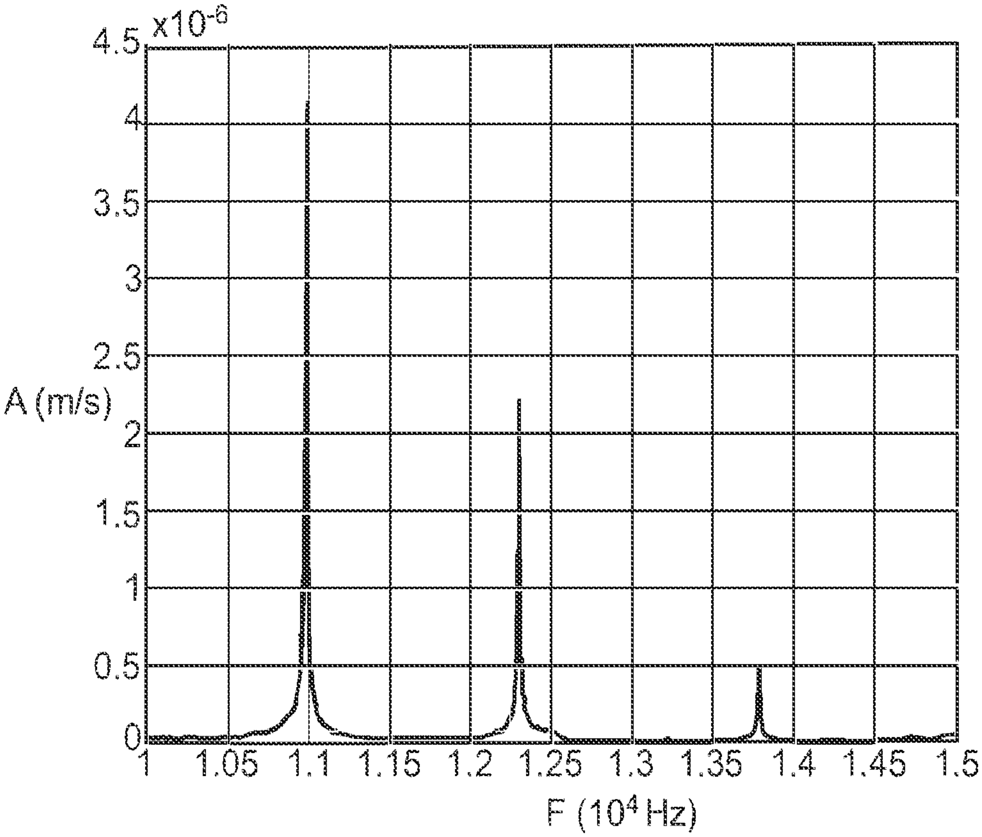
FIG. 7 shows an example of measurement of the amplitudes of displacement of a point of a spiral blank, in response to the imposed frequency range in FIG. 6.

FIG. 7 shows an example of a vibrational spectrum for a point of a spiral blank 200 of FIG. 5, reconstructed based on displacement amplitude measurements of the measurement point under consideration in response to the vibrational excitation of FIG. 6, between 10 kHz and 15 kHz. Note the presence of three amplitude peaks, at approximately 11 kHz, 12.3 kHz, and 13.7 kHz. Although this is not shown, between 10 and 30 amplitude peaks can typically be identified if the vibrational excitation scans a frequency range between 0 Hz and 50 kHz. Each amplitude peak has a resonant frequency, and the maximum amplitudes vary greatly.

Figure 8:
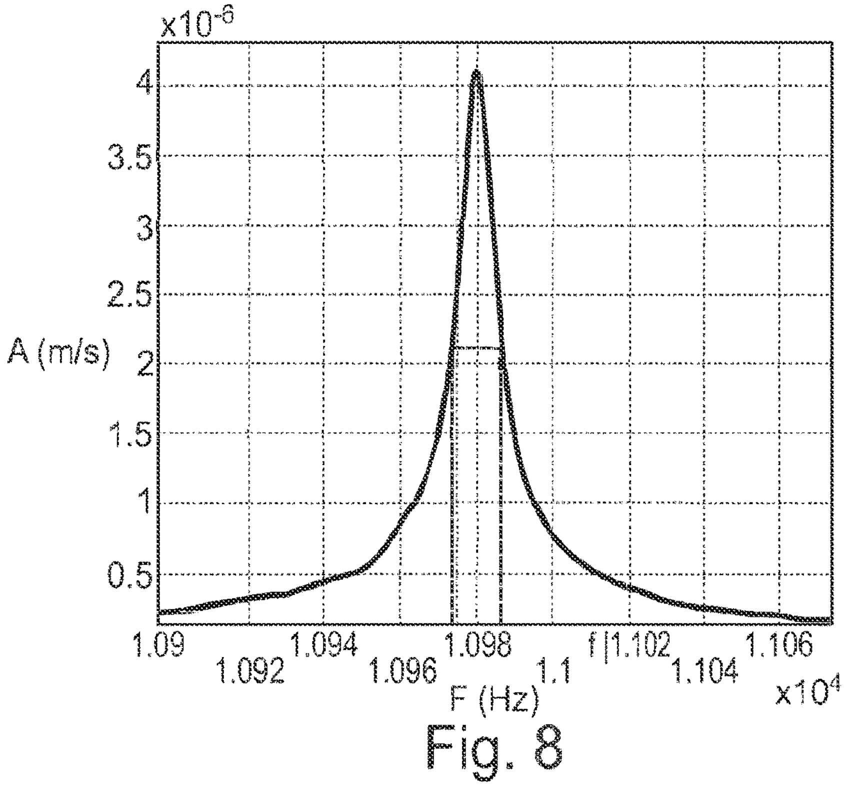
FIG. 8 shows in retail a resonance peak identified at a particular frequency in FIG. 7.

FIG. 8 shows in detail the processing that can be done on an amplitude peak, that at 11 kHz for example. The aim is to find the resonant frequency and give it as accurate a value as possible. Instead of basing this processing on the maximum value of the peak, the applicant has noticed that a better accuracy could be reached by determining the length of the segment connecting the rising part and the falling part of the curve, at mid-height of the peak. The resonant frequency is typically the value in the middle of this segment. However, one may carry out an interpolation on points in the vicinity of the resonance peak to improve the accuracy, and offset the chosen point on the segment, which will not be the middle, in particular if the actual position of the resonance peak is offset, for example due to the chosen sampling frequency.

Figure 9:
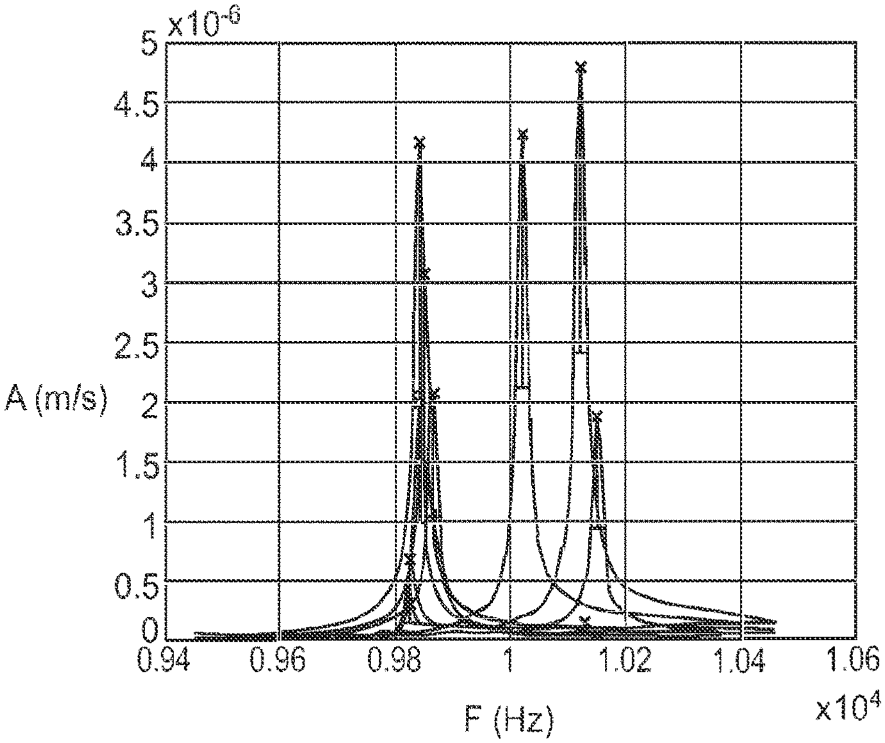
FIG. 9 shows the measured and superimposed resonance peaks for the particular frequency of FIG. 8.

FIG. 9 shows, for the example of an amplitude peak at approximately 10 kHz, the amplitude peaks constructed for ten tested spiral blanks 200. Note that from one spiral blank to the other, the frequency position of the amplitude peak varies (from 9.8 kHz to 10.02 kHz approximately), and the maximum displacement amplitude varies in a ratio of approximately 1 to 5. Since the amplitude peak apices are not truly synthetic, it seems advisable to determine the resonant frequency on the basis of the width of the peak at mid-height.

For these tests of FIG. 9, the following resonant frequencies were identified:

| Spiral no. | Resonant frequency (Hz) |
|---|---|
| 2 | 9824 |
| 9 | 9824 |
| 3 | 9840 |
| 8 | 9840 |
| 7 | 9848 |
| 4 | 9863 |
| 10 | 10020 |
| 5 | 10121 |
| 1 | 10129 |
| 6 | 10148 |

Determination of the Stiffness and/or Actual Dimensions of the Bar of Tested Resonators To establish a prediction model that can receive as input the vibrational characteristics (typically a resonant frequency) and give as output a stiffness and/or a dimensional correction, it is necessary, during the training phase, to supply the data relating to the actual stiffness and/or dimensions of the bar of tested resonators. For this purpose, provision can be made for practically measuring a natural frequency of a spiral-balance system in an environment similar to that of a particular watch mechanism.

Two alternatives can be implemented. As a first alternative it is possible to couple a predetermined balance directly onto the resonator still attached to the wafer, and measure a natural oscillation frequency of the resonator—balance pair to compare this natural frequency with an expected natural frequency and above all compute the actual stiffness or the actual dimensions based on the equations 1 to 3 above. As a second alternative, it is possible to finish fabricating the tested resonators, in order to set them up or couple them with a balance individually, here again to measure a natural oscillation frequency of the resonator—balance pair.

In the two alternatives above, it is possible to proceed via an intermediate step of determining the stiffness of each resonator, and then to determine the actual dimensions of the bar of the tested resonators. In other words, it is possible to determine the natural frequency or a resonant frequency and then the stiffness or the dimensions of the bar of the resonator by analyzing the free oscillations of a spiral coupled with a reference balance. In this approach, a laser pointed at the arms of the balance or at the spiral carrier records the times at which the arms of the balance or a safeguard device pass. One then deduces therefrom an estimate of the period, then of the frequency and finally the stiffness. The data collected are essentially scatter plots of the times of passage.

Specifically, to assess the stiffness of a spiral on the wafer, several solutions are available, as described by M. Vermot et al, in the Traité de construction horlogère (2011) on pages 178-179. For example, a dynamic evaluation can be made, by coupling the spiral with a reference balance, the inertia of which is known. The measurement of the frequency of the assembly makes it possible to deduce the stiffness of the spiral, accurately. This evaluation can be carried out on the wafer or by detaching the spiral from the wafer. The references and priorities given above provide details of this method.

Similarly, the stiffness can also be deduced from a measurement of the reaction torque at the ferrule by means of a rheometer. The acquired signal represents the variation of the torque as a function of amplitude. The analysis of the gradient of this curve for low amplitudes (linear part) makes it possible to deduce the stiffness, and then the dimensions of the bar of the resonator. The dimensions of the bar of the spiral can then be determined.

Moreover, provision can be made for estimating by simulation a natural frequency and/or a resonant frequency and/or the stiffness for each tested resonator on the wafer. For this purpose, dimensional measurements of each tested resonator can be taken to reconstruct the resonator by numerical modeling in order to simulate its vibrational response to the imposed spectrum by numerical calculation, and to also find the stiffness of the resonator.

An approach by 3D tomography by high-resolution X-ray would make it possible to extract scatter plots giving the 3D material density of the spirals, and, subject to a reconstruction of the adapted images, a mapping of the section of the spiral. These different types of data can be used to deduce the dimensions of the bar and to estimate the stiffness of the spiral by a geometrical approach.

Another approach consists in analyzing the driven oscillations of a spiral on a reference balance with an escapement. A laser measurement of the time of passage of the arms of the balance (scatter plots), as described above, can be used to measure the frequency and to deduce the stiffness therefrom. An alternative can be envisioned based on an acoustic acquisition (Witschi-type microphone) which records the shocks of the different operating phases of the escapement/securing system. The measured data are either scatter plots of the times of passage of the arms of the balance, or the variation over time of the acoustic pressure level. These types of experimental data can be used to deduce the period, then the frequency, then the stiffness and finally the dimensions of the bar of the resonator.

Returning to the tests discussed above in FIG. 9, a measurement of the stiffness has been taken by coupling each spiral blank 200 with a reference balance, and the stiffnesses below were deduced:

| Spiral no. | Measured stiffness ($10^{-7}$ N · mm) |
|---|---|
| 2 | 3.89 |
| 9 | 3.88 |
| 3 | 3.92 |
| 8 | 3.90 |
| 7 | 3.91 |
| 4 | 3.95 |
| 10 | 4.111 |
| 5 | 4.135 |
| 1 | 4.119 |
| 6 | 4.196 |

Establishment of the Prediction Model

During the training phase, the oscillation amplitude measurements are carried out on physical resonators, and resonant frequencies are identified. In order to be able to subsequently relate the resonant frequencies measured on resonators to stiffnesses and/or corrections of dimension (thickness) to be made, provision must be made for a correlating phase during which a predictive model is constructed.

The operations described above (vibrational measurements, identification of the resonance peaks, mid-height bandwidth and its middle or corrected value, determination of the stiffness and/or dimensions of the bar) are used to supply a database which can relate the position of the spiral on the wafer, of the spectra or oscillation periods or mid-height bandwidth and its middle or corrected value with the stiffnesses and/or effective dimensions of the bar of the spiral. As seen above, this database can be constructed from numerical simulations on a finite element model of a spiral. These simulations make it possible to generate reference spectra or oscillation periods associated with the stiffnesses. This database can also be completed by experimental measurements by measuring vibration spectra, oscillation periods and the positions of spirals on the wafer along with their associated stiffnesses. One of the advantages of this approach lies in the fact that the training database is enriched gradually as the tests proceed. This can make it possible to have an adaptive model according to the wafers and the spirals and contributes to the reduction of the standard deviation on wafer stiffness.

This database can be used to build a prediction model, and several solutions are available.

A numerical model, for example polynomial, can be constructed to compute, as a function of a resonant frequency value, an actual thickness, a dimensional correction or an actual stiffness.

A categorization can also be made by making a partitioning into k-means of input data (the results of vibrational measurements, typically the frequency of the resonance peaks) and output data (stiffness, and/or dimensions of the bar of the resonator) and relate them to one another to establish a correspondence.

Provision can also be made for processing the images of the resonance peaks by a neural network, for example a perceptron, to make a classification by stiffness or bar dimensions, the classes being able to be defined by increments of values.

In summary, the training phase comprises a test phase (excitation of resonators with measurement of the vibrational characteristics to reconstruct a vibration spectrum and identify resonant frequencies). A phase of measuring stiffnesses and/or dimensions of the bar of the resonators is also carried out. Once the input data (resonant frequencies) and output data (stiffnesses and/or dimensions of the bar) for a significant sample are available, the phase of construction of the prediction model can be carried out.

To return to the example addressed and described in relation to FIG. 9, the collected data are as follows:

| Spiral no. | Resonant frequency (Hz) | Measured stiffness ($10^{-7}$ N · mm) |
|---|---|---|
| 2 | 9824 | 3.89 |
| 9 | 9824 | 3.88 |
| 3 | 9840 | 3.92 |
| 8 | 9840 | 3.90 |
| 7 | 9848 | 3.91 |
| 4 | 9863 | 3.95 |
| 10 | 10020 | 4.111 |
| 5 | 10121 | 4.135 |
| 1 | 10129 | 4.119 |
| 6 | 10148 | 4.196 |

A linear regression model was made for the data above for the first six rows, and the relationship below was able to be established:

$$R=0.0015F-10.894,$$

With

R for the stiffness in $10^{-7}$ N·mm

F for the resonant frequency in Hz.

The stiffness can therefore be predicted and compared with the actual stiffness measured as shown in the table below, with for the first six rows the data used to build or train the linear regression, and for the last four rows, a prediction only:

| No | F (Hz) | R ($10^{-7}$ N · mm) measured | R ($10^{-7}$ N · mm) predicted | deviation |
|---|---|---|---|---|
| 2 | 9824 | 3.89 | 3.84 | −1.20% |
| 9 | 9824 | 3.88 | 3.84 | −1.10% |
| 3 | 9840 | 3.92 | 3.87 | −1.40% |
| 8 | 9840 | 3.9 | 3.87 | −0.90% |
| 7 | 9848 | 3.91 | 3.88 | −0.70% |
| 4 | 9863 | 3.95 | 3.9 | −1.20% |
| | | Test | | |
| 10 | 10020 | 4.111 | 4.136 | 0.60% |
| 5 | 10121 | 4.135 | 4.288 | 3.70% |
| 1 | 10129 | 4.119 | 4.3 | 4.40% |
| 6 | 10148 | 4.196 | 4.328 | 3.20% |

Figure 10:
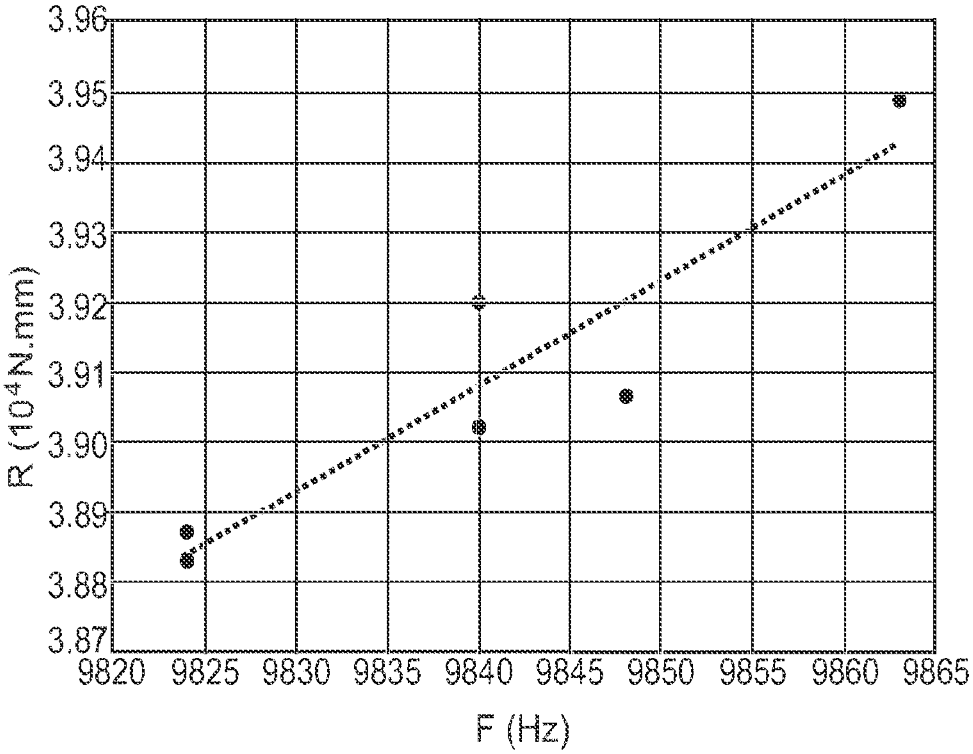
FIG. 10 represents an example of a prediction model constructed based on data extracted from FIG. 9.

A maximum error of 4.40% was able to be measured, and the FIG. 10 shows the linear regression curve for the values of the first six rows.

Note that it is advantageous to check that the established prediction model has a good sensitivity, i.e. for two different input values, the model gives two distinct output values. The applicant noticed that the sensitivity of the prediction model was not the same for all the resonance peaks. In particular, if one refers to the prediction formula established and shown in FIG. 10, the slope coefficient is 0.0015 $10^{-7}$ N·mm/Hz. On the one hand, the applicant noticed that the slope coefficient could be greater for high resonant frequencies, which procures a better prediction sensitivity, to predict distinct stiffness values or dimensional correction values, even based on similar resonant frequency values. It is advantageous to make provision, during the training phase, for a step of comparing the sensitivity of the prediction to check/confirm that it is preferable to consider and choose certain resonance peaks at high frequencies (for example above 5 kHz) to then predict as accurately as possible a stiffness and/or a dimensional correction as a function of the measured vibrational response.

On the other hand, the applicant also noticed that even for similar resonant frequencies, the resonance modes (particularly modes of deformation and/or displacement of the resonators) could significantly differ, which can also affect the stiffness and/or dimensional correction prediction sensitivity. It is advantageous to make provision, during the training phase, for a step of comparing the sensitivity of the prediction to choose considering subsequently one particular resonant frequency to then predict as accurately as possible a stiffness and/or a dimensional correction as a function of the vibrational response.

From the remarks above relating to the study of the prediction sensitivity, provision can be made, during the training phase, for classing the different identified resonance peaks according to the stiffness and/or dimensional correction prediction sensitivity. Provision can then be made for defining the excitation frequency range (which will be applied during a pure prediction phase) to include at least one or more resonant frequency peaks which give the best sensitivity. Thus, imposing a vibrational excitation which varies over the frequency range thus predetermined will guarantee the ability to make an accurate prediction for the identified resonance peak or predictions for each of the identified resonance peaks, which overlap or confirm one another.

In general, the training phase makes it possible to choose either resonance peaks at high frequencies and/or resonance peaks which correspond to particular modes of resonance used to predict accurate and reliable values, and the frequency range will be predetermined to include at least one resonance peak and preferably several, to be able to make either a single prediction which is as accurate as possible, or several predictions (one per resonance peak deemed of interest) to then make overlaps, means or recalibrations of the predicted values.

Provision can for example be made for predicting several values of stiffness or of dimensional corrections based on several peaks or resonant frequencies, and then computing a final value, by taking, based on the predicted values, a weighted mean by assigning weights to each predicted value, each weight being determined as a function of the sensitivity identified for each peak or corresponding resonant frequency.

Alternatively and preferably, provision can be made for having only a single model which takes all the peaks of resonant frequencies as input and which returns the stiffness or the dimensional correction, the training phase of the model service serving precisely to compute the weightings on the input peaks or resonant frequencies.

Prediction Phase

Once the training phase is finished, it is possible to pass on to a prediction phase, for example during a method for inspecting resonators. The inspecting method can typically be carried out on spiral blanks made on a wafer and still attached to this wafer, such as to estimate the stiffness and/or dimensions of the bar of the spirals of the sample, in order to determine whether or not a dimensional correction is to be made.

Once the model has been trained, the inspecting procedure to be deployed is as follows:

1) Marking the position of the spiral on the wafer, vibrational measurement of the spectra or oscillation period (as described above),
2) Predicting the stiffness and/or dimensions of the bar of the spiral by applying the predictive model,
3) Determining whether or not a dimensional correction is necessary to achieve the target natural frequency or stiffness.

During the inspecting method, it is also possible to quantify the exact correction to be made, such that the fabricating method can include, in addition to the inspection above:

1) Knowing the effective stiffness of the spiral(s) estimated according to the model and the target stiffness and/or the target dimensions of the bar: applying the necessary corrective measure.

Repeating step 1) and step 2) of the inspecting method to control the stiffness/dimensions of the spiral and confirm that the target values are achieved, to the nearest tolerance threshold, or repeating these steps and the dimensional correction until the stiffness/dimension predicted by the model reaches the target values.

Sampling

It is known to fabricate several hundreds of spirals on one wafer and that the dimensions of the bar of the spirals made can vary according to the regions of the wafer. If the evaluation of the stiffness can be done on a single spiral, in practice, it will be carried out on a sample of spirals, distributed across the wafer.

Based on the evaluations made, the corrections can be made for any wafer uniformly, or else differentiated by region, if the obtained results vary from one spiral to another. It is thus possible to reduce the standard deviation on the stiffness dispersion. Moreover, if the stiffnesses of all the spirals by application of the model are known, it is possible to determine the optimal correction for reducing the overall dispersion.

It can even be envisioned to evaluate all the spirals of the wafer, particularly with a vibrational evaluation, since this is very fast to carry out.

Although the examples above have been predetermined mainly on the basis of a fabrication of spirals having initial bar dimensions which are greater than the target bar dimensions, provision can also be made for making spirals having initial bar dimensions which are smaller than the target bar dimensions. The correcting step then consists in adding material, as for example described in the abovementioned document EP3181939.

The method, consisting in identifying resonant frequencies by imposing a vibrational excitation on the spiral blanks alone makes it possible to quickly obtain measuring data, without for example having to perform operations of assembly of a balance, while limiting measurement errors since only the spiral blank is tested (there is no error that can be related to the balance, such as its mass, its assembly position etc.)

The invention claimed is:

1. A method for inspecting a spiral or a spiral blank arranged to form a spiral, the spiral having to exhibit at least one predetermined resonant frequency, the inspecting method including the following steps:

a. applying to the spiral alone or to the spiral blank alone a time-varying vibrational excitation to cover a predetermined frequency range, b. identifying at least one characteristic of a resonant frequency of the spiral or of the spiral blank during the vibrational excitation over the predetermined frequency range, c. submitting to a prediction model the resonant frequency characteristic identified in the step b. to determine a stiffness of the spiral or of the spiral blank and/or determine whether or not a dimensional correction of the spiral or of the spiral blank is necessary to obtain the predetermined resonant frequency.

2. The inspecting method as claimed in claim 1, wherein the frequency range is predetermined to encompass at least one frequency range:

centered on the predetermined resonant frequency, and of an extent ranging from 85% to 115% of the predetermined resonant frequency.

3. The inspecting method as claimed in claim 1, the spiral having at least two predetermined resonant frequencies, wherein the frequency range is predetermined to cover at least the two predetermined resonant frequencies.

4. The inspecting method as claimed in claim 1, wherein the step b is based on a measurement over time of an amplitude or of a speed or of an acceleration of displacement of at least one point of the spiral or of the spiral blank.

5. The inspecting method as claimed in claim 1, the spiral or the spiral blank being contained in a base plane, wherein the step b comprises:

a step b' of measuring an amplitude or a speed or an acceleration of displacement of at least one point of the spiral or of the spiral blank along a direction normal to the base plane, and/or a step b" of measuring an amplitude or a speed or an acceleration of displacement of at least one point of the spiral or of the spiral blank along a direction contained in the base plane.

6. The inspecting method as claimed in claim 4, wherein the step b comprises:

a step of identifying a resonance peak of the spiral or of the spiral blank as a function of an amplitude or of a speed of displacement of at least one point of the spiral or of the spiral blank.

7. The inspecting method as claimed in claim 6, wherein the resonant frequency is identified on the basis of the width of the resonance peak, 50% of the maximum value of the resonance peak.

8. The inspecting method as claimed in claim 1, wherein, if a dimensional correction is necessary, then the method comprises a step of:

d. computing, with the predicting model, the dimensional modification to be applied based on the identification of step b.

9. The inspecting method as claimed in claim 1, wherein the predicting model implements a polynomial formula to predict whether or not a dimensional correction is necessary.

10. The inspecting method as claimed in claim 1, wherein the predicting model implements a classification to predict whether or not a dimensional correction is necessary.

11. The inspecting method as claimed in claim 1, the spiral blank being formed on a wafer comprising a plurality of spiral blanks distributed over several sectors of the wafer, wherein the step b comprises a step consisting in identifying at least one characteristic of a resonant frequency of at least one spiral blank for each sector, and wherein the step c comprises a step consisting in determining for the spiral blanks of each sector a stiffness and whether or not a dimensional correction is necessary.

12. The inspecting method as claimed in claim 1, comprising a preliminary step consisting in taking into account the material of the spiral or of the spiral blank, and in adjusting a maximum amplitude of the vibrational excitation and/or a range of frequency of the predetermined frequency range as a function of the material of the spiral or of the spiral blank.

13. The inspecting method as claimed in claim 1, wherein the frequency range extends over a range of frequencies ranging from 0 Hz to 100 kHz.

14. A method for fabricating a spiral having at least one predetermined resonant frequency comprising the steps consisting in:

forming at least one spiral or one spiral blank having dimensions contained within predetermined tolerances necessary to obtain the predetermined resonant frequency, inspecting the spiral or the spiral blank according to the inspecting method of claim 1.

15. The fabricating method as claimed in claim 14, comprising a step consisting in:

correcting at least one dimension of the spiral blank formed during the step a., by computing, with the predicting machine, the dimensional modification to be applied based on the resonant frequency characteristic identified in the step b, in order to obtain a spiral having the predetermined resonant frequency.

16. The fabricating method as claimed in claim 14, wherein the spiral blank is formed on a wafer, with a plurality of other spiral blanks.

17. A method for training a predicting machine for implementing the step c of the inspecting method of claim 1, comprising the steps consisting in:

i—forming spirals or spiral blanks, ii—applying to each of the spirals or to each of the spiral blanks a time-varying vibrational excitation to cover a predetermined frequency range, iii—identifying at least one characteristic of a resonant frequency of each spiral or of each spiral blank during the application of the predetermined frequency range, iv'—setting up a plurality of spirals or of spiral blanks in an oscillating mechanism having a predetermined inertia such as to measure for each spiral or each spiral blank a free oscillation frequency or a stiffness, and/or iv"—modeling in a simulation tool a plurality of spirals or of spiral blanks in an oscillating mechanism having a predetermined inertia such as to measure for each spiral or each spiral blank a free oscillation frequency or a stiffness v—supplying to the predicting machine, and for each spiral or each blank:

the characteristic of the resonant frequency identified in the step iii—;

the free oscillation frequency or the stiffness(es) measured in the step iv'— and/or computed in the step iv"—.

18. The training method as claimed in claim 17, wherein the step iii— comprises a preliminary phase of identifying reference measuring points with:

the measurement of a displacement of a plurality of predetermined points of the spiral or of the spiral blank, the identification of nodes from among the plurality of predetermined points, which have at least one frequency or resonance peak a displacement amplitude which is zero or less than a first threshold peak value, selecting reference points to be measured during the inspection from among the plurality of predetermined points, which are different from the identified nodes, and which preferably each have a displacement amplitude peak greater than a second threshold peak value.

* * * * *